US008785337B2

(12) United States Patent  
Barton et al.

(10) Patent No.: US 8,785,337 B2  
(45) Date of Patent: Jul. 22, 2014

(54) GLASS CONTAINER COMPOSITION

(75) Inventors: Stephen D. Barton, Dansville, NY (US); Carol A. Click, Perrysburg, OH (US); Terence K. G. Howse, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 153 days.

(21) Appl. No.: 13/179,161

(22) Filed: Jul. 8, 2011

(65) Prior Publication Data

US 2013/0011588 A1    Jan. 10, 2013

(51) Int. Cl.
| | |
|---|---|
| C03C 3/089 | (2006.01) |
| C03C 3/087 | (2006.01) |
| C03B 9/00 | (2006.01) |
| C03B 11/00 | (2006.01) |
| C03B 13/00 | (2006.01) |
| C03B 15/00 | (2006.01) |

(52) U.S. Cl.
USPC .................. 501/70; 501/65; 65/66; 65/69

(58) Field of Classification Search
USPC ............. 501/65, 66, 68, 69, 70; 65/66, 68, 69
See application file for complete search history.

(56) References Cited

U.S. PATENT DOCUMENTS

| 2,923,635 A | 2/1960 | Beck et al. |
|---|---|---|
| 2,923,636 A | 2/1960 | Swain |
| 2,955,948 A | 10/1960 | Silverman |
| 2,974,052 A | 3/1961 | Bacon et al. |
| 3,291,621 A | 12/1966 | Hagedorn |
| 3,326,702 A | 6/1967 | Babcock |
| 3,498,806 A | 3/1970 | Hammer et al. |
| 3,627,548 A | 12/1971 | Hammer et al. |
| 5,066,621 A * | 11/1991 | Akhtar ............................. 501/41 |
| 5,908,702 A * | 6/1999 | Mita et al. ...................... 428/426 |
| 6,407,021 B1 * | 6/2002 | Kitayama et al. ............... 501/70 |
| 6,622,524 B1 | 9/2003 | Barklage-Hilgefort et al. |
| 6,846,760 B2 * | 1/2005 | Siebers et al. .................. 501/32 |
| 7,033,967 B2 | 4/2006 | Foguenne et al. |
| 7,151,065 B2 | 12/2006 | Thomsen et al. |
| 7,304,009 B2 | 12/2007 | Coster et al. |
| 7,534,735 B2 | 5/2009 | Coster et al. |
| 7,713,895 B2 * | 5/2010 | Maquin et al. .................. 501/70 |
| 7,825,051 B2 * | 11/2010 | Smith et al. .................... 501/64 |
| 2010/0040812 A1 | 2/2010 | Buckett et al. |

FOREIGN PATENT DOCUMENTS

| DE | 202007004821 U1 | 9/2007 |
|---|---|---|
| EP | 0799805 A1 | 10/1997 |
| FR | 2918052 A1 | 1/2009 |
| GB | 2274841 A | 8/1994 |
| GB | 2426005 A | 11/2006 |
| JP | 2002249338 A | 9/2002 |

OTHER PUBLICATIONS

Selenium dioxide as a constituent of glasses. Navias et al. Journal of the American Ceramic Society. vol. 14, Issue 6, Jun. 2, 2006.*
International Search Report and the Written Opinion for International Application No. PCT/US2012/041596, International Filing Date—Jun. 8, 2012, Mailing Date—Mar. 12, 2013, 18 pages.
International Preliminary Report on Patentability, International Application No. PCT/US2012/041596, International Filing Date: Jun. 8, 2012, Mailing Date: Jul. 19, 2013, 8 pgs.

* cited by examiner

*Primary Examiner* — Noah Wiese

(57) ABSTRACT

A glass container and related methods of manufacturing. The glass container has a glass composition including soda-lime base glass materials, and an oxide of vanadium for good ultraviolet light blocking properties and an oxide of selenium to decolor the glass for good clarity and decolorization. The glass composition of the glass container also may include an oxide of sulfur.

40 Claims, 2 Drawing Sheets

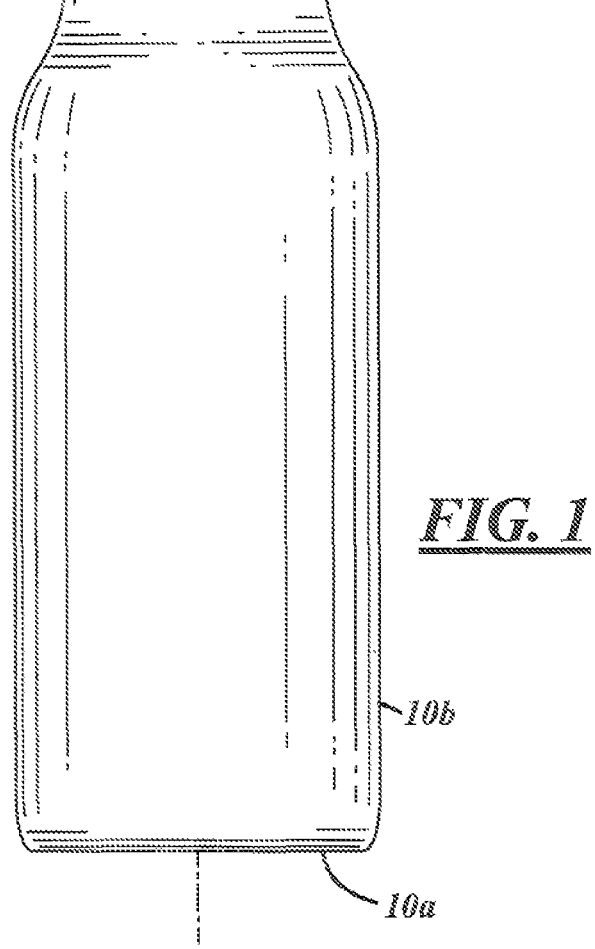
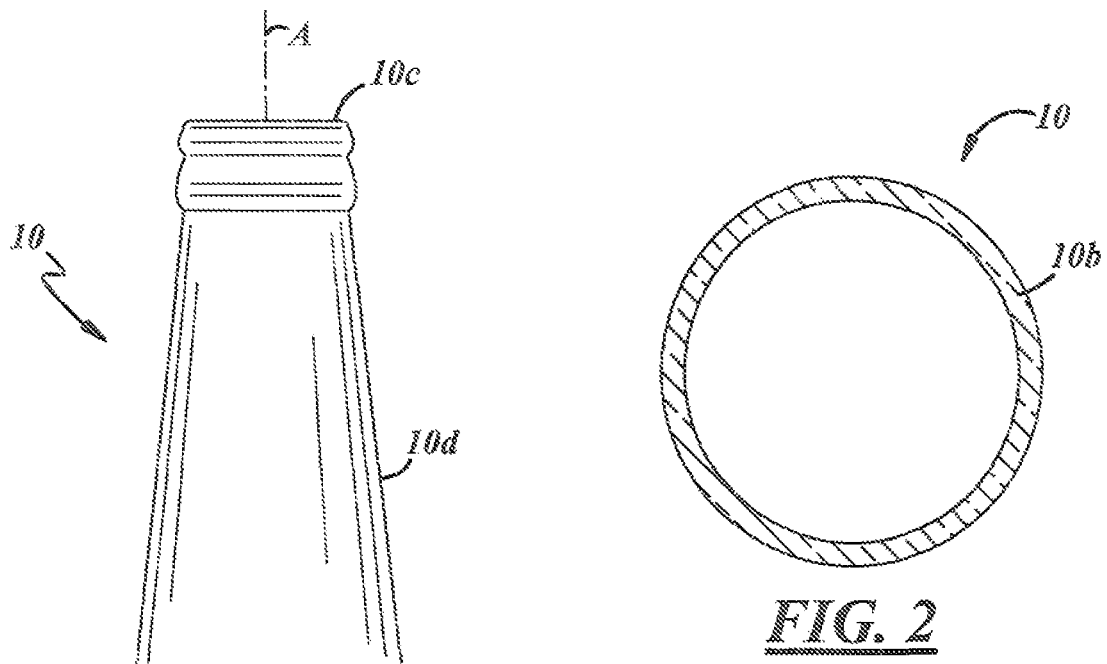

GLASS CONTAINER COMPOSITION

The present disclosure is directed to glass containers and, more particularly, to compositions for glass containers.

BACKGROUND AND SUMMARY OF THE DISCLOSURE

Glass containers are often composed of so-called "soda-lime glass," also called "soda-lime-silica glass," and many such containers are colored to absorb ultraviolet radiation, and include green glass, blue glass, amber glass, and the like. For example, a base flint glass may be melted in a glass melt furnace and, downstream of the furnace, in one or more forehearths, colorants may be added to the base glass to impart green, blue, or amber hues to the glass. U.S. patents that illustrate glass compositions of this type for glass containers include U.S. Pat. Nos. 2,974,052, 3,291,621, 3,326,702, 3,498,806, and 3,627,548.

Before the colorants are added, a decolorizer may be added to a batched glass composition of the base flint glass in the glass melt furnace to ensure a generally colorless appearance of the glass. But the decolorizer, such as selenium, tends to dull the effect of the colorants added downstream in the forehearths. Accordingly, additional materials accompany the decolorizer to counteract such detrimental effects of the decolorizer. For example, arsenic oxide or hexavalent chromium have been added to neutralize selenium. U.S. patents that illustrate glass compositions of this type for glass containers include U.S. Pat. Nos. 2,923,635, and 2,923,636. In other implementations, selenium can be added in the forehearths downstream of the glass melt furnace, as illustrated by U.S. Pat. No. 2,955,948.

A general object of the present disclosure, in accordance with one aspect of the disclosure, is to provide a container glass composition having an oxide of vanadium and an oxide of selenium to produce substantially clear glass containers with a relative non-green appearance and with good blocking of ultraviolet light.

The present disclosure embodies a number of aspects that can be implemented separately from or in combination with each other.

A flint glass container in accordance with one aspect of the disclosure includes an improvement for blocking ultraviolet light penetration into the container while providing decolorization in container glass, wherein the container glass includes an oxide of vanadium and an oxide of selenium present in the container glass in an amount ranging between 0.016 wt % and 0.175 wt % total.

In accordance with another aspect of the disclosure, there is provided a glass container having a glass composition including soda-lime base glass materials, and additives including an oxide of vanadium and an oxide of selenium retained in the container glass in an amount ranging between 0.016 wt % and 0.175 wt % total.

In accordance with an additional aspect of the disclosure, there is provided a method of making glass containers including the steps of preparing a batched glass composition including soda-lime base glass materials, and including an oxide of vanadium and an oxide of selenium in an amount ranging between 0.035 wt % and 0.25 wt % total, melting the batched glass composition in a glass melt furnace to produce a molten batched glass, forming the glass containers from the molten batched glass, and annealing the glass containers.

In accordance with a further aspect of the disclosure, there is provided a method of making glass containers including steps of preparing a batched glass composition including soda-lime base glass materials, and additives including an oxide of vanadium and an oxide of selenium in substantially equal amounts, melting the batched glass composition in a glass melt furnace to produce a molten batched glass, forming the glass containers from the molten batched glass, and annealing the glass containers.

BRIEF DESCRIPTION OF THE DRAWINGS

The disclosure, together with additional objects, features, advantages and aspects thereof, will be best understood from the following description, the appended claims and the accompanying drawings, in which:

FIG. 1 is an elevational view of a glass container in accordance with an exemplary embodiment of the present disclosure;

FIG. 2 is a cross-sectional view of the glass container body before coating.

DETAILED DESCRIPTION OF PREFERRED EMBODIMENTS

Figure 3:
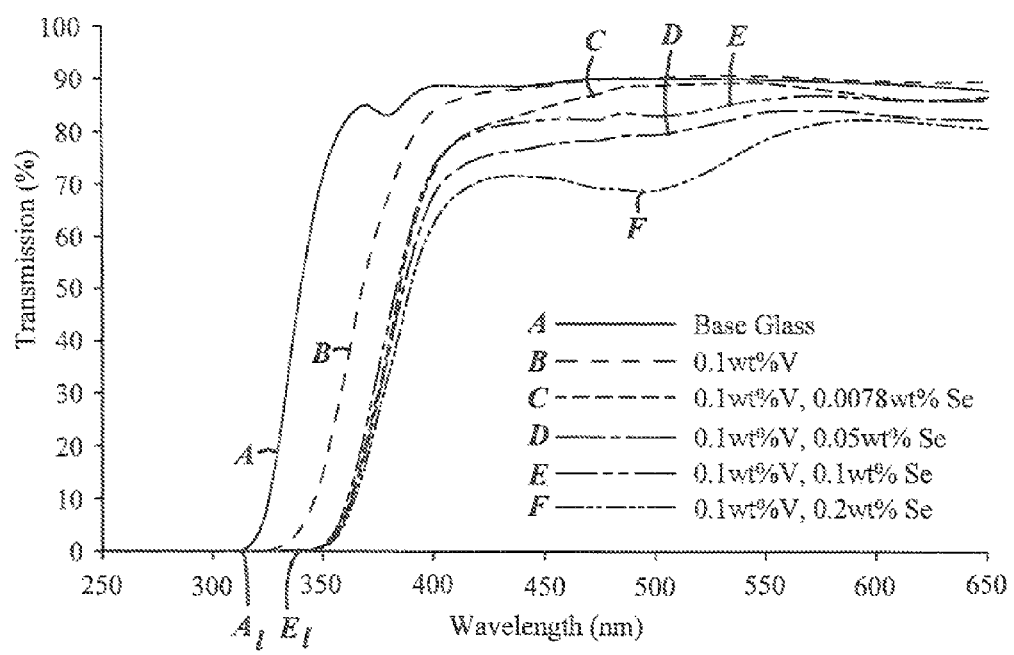
FIG. 3 is a graphical plot of light transmission through samples of container glass having various amounts of oxides of vanadium and selenium.

FIG. 1 illustrates an exemplary embodiment of a glass container 10 (e.g., glass bottle, jar, or the like) that may be produced in accord with an exemplary embodiment of a manufacturing process presently disclosed herein below. The glass container 10 includes a longitudinal axis A, a base 10a at one axial end of the container 10 that is closed in an axial direction, a body 10b extending in an axial direction from the axially closed base 10a, and a mouth 10c at another axial end of the container 10 opposite of the base 10a. Accordingly, the glass container 10 is hollow. In the illustrated embodiment, the container 10 also includes a neck 10d that may extend axially from the body 10b, may be generally conical in shape, and may terminate in the mouth 10c. However, the container 10 need not include the neck 10d and the mouth 10c may terminate the body 10b, such as in a glass jar embodiment or the like. The body 10b may be of any suitable shape in cross-section transverse to the axis A as long as the body 10b is circumferentially closed.

For example, as shown in FIG. 2, the body 10b may be of cylindrical transverse cross-sectional shape that is circumferentially closed. In other embodiments, the body 10b may be generally oval, square, rectangular, triangular, or of any other suitable transverse cross-sectional shape. As used herein, the term "circumferentially" applies not only to circular transverse cross-sectional shapes but also applies to any closed transverse cross-sectional shape.

The glass container 10 may be produced by the following method.

The method includes preparing a batched glass, or glass batch, composition. The composition includes base glass materials and additives including at least one ultraviolet (UV) light blocking enhancing material and at least one decolorizer. As used herein, the terminology "ultraviolet light blocking" includes the characteristic or property of reducing ultraviolet light transmission in a relative sense, and not necessarily in an absolute sense of UV opacity or zero UV light transmission.

The base glass materials may include soda-lime flint glass materials. For example, the base glass materials may be present in an amount ranging between 73.1 wt % and 99.9 wt % of the batched glass composition. More particularly, and by way of example only, the base glass may include the following materials in amounts by weight:

| | |
|---|---|
| 60-75% | $SiO_2$ |
| 7-15% | $Na_2O$ |
| 6-12% | CaO |
| 0.1-3.0% | $Al_2O_3$ |
| 0-2.0% | MgO |
| 0-2.0% | $K_2O$ |

In a preferred embodiment, the base glass may include the following materials in about the stated amounts by weight:

| | |
|---|---|
| 72% | $SiO_2$ |
| 13% | $Na_2O$ |
| 10% | CaO |
| 1.2% | $Al_2O_3$ |
| 0.2% | MgO |
| 0.2% | $K_2O$ |

The batched glass composition also may include other materials in small amounts. For example, the batched glass composition may include $TiO_2$, $Fe_2O_3$, or the like. Such materials may be additives, residual materials from cullet, and/or impurities typical in the glass container manufacturing industry. Such materials may be present in the batched glass composition in trace amounts, for example, less than 0.2 wt %. But no arsenic (As), oxides of As, or hexavalent chromium are affirmatively added to the batched glass composition and, thus, the composition and container may be substantially free of those materials.

The preferred ultraviolet light blocking enhancing material includes vanadium. Vanadium forms numerous and complicated compounds because of its variable valence. Vanadium has at least three oxidation states: 2+, 3+, and 5+. Trivalent vanadium can be used to produce a green coloration in flint glass, and enhances ultraviolet light protection to glass. In general, the vanadium may be added in the form any oxide of vanadium. In one specific example, the vanadium may be added in the form of vanadium pentoxide ($V_2O_5$). In the absence of the presently disclosed decolorizer, the vanadium tends to produce a sea green coloration in the glass.

A preferred decolorizer includes selenium. In one example, the selenium may be added in the form of granulated selenium metal. In other examples, the selenium may be in the form any oxide of selenium, for example, selenium dioxide ($SeO_2$) or selenium trioxide ($SeO_3$).

Another preferred material includes sulfur. In one example, at least some of the sulfur may be added in the form of any oxide of sulfur, for example, sulfur trioxide ($SO_3$). In another example, at least some of the sulfur may be present as a residual material from cullet in any suitable form.

In one embodiment, the oxide of vanadium and oxide of selenium present in the batched glass composition may be in an amount ranging between 0.035 wt % and 0.25 wt % total. In other words, the total combined amount of oxides of vanadium and selenium in the glass batch equals 0.035 wt % to 0.25 wt %. In another embodiment, the oxides of vanadium and selenium are present in the batched glass composition in substantially equal amounts. As used herein the term "substantially" means within manufacturing tolerances customary in the glass container manufacturing industry. In another embodiment, the oxide of vanadium may be present in the batched glass composition in an amount ranging between 0.025 wt % and 0.15 wt %, and the oxide of selenium may be present in the batched glass composition in an amount ranging between 0.01 wt % and 0.1 wt %. In one specific example, the oxides of vanadium and selenium each may be present in amounts of about 0.1 wt %. In another specific example, the oxides of vanadium and selenium each may be present in amounts of about 0.05 wt %. As used herein the term "about" means within 0.02 wt %.

In addition to the oxide of selenium, it is believed that the oxide of sulfur plays a role in producing a decolorized, or neutral colorization of, vanadium-selenium-containing glass. In development it was observed that glass melted with oxides of vanadium and selenium in the absence of oxide of sulfur tends to produce pink-peach coloration and minimal decolorization of the sea green coloration from the oxide of vanadium.

It was also observed that increasing oxide of sulfur content to a level up to about 0.4 wt % showed an increase in decolorization of the glass. In one example, when oxide of sulfur content was increased to a level between 0.1 wt % and 0.2 wt %, a shift in coloration was observed including a gray stroke/straw yellow coloration in a top melt portion of the glass, with a decrease in the pink-peach coloration and shift of that coloration to a location centered around the bottom melt portion of the glass. In another example, when oxide of sulfur content was increased to a level of about 0.4 wt %, the glass melt was substantially decolorized with no pink-peach coloration remaining in the glass. However, some greenish-yellowish coloration was noticeable to the eye through a relatively long section of the glass, but was not visible to the eye within a relatively short section of the glass (e.g. a 38 mm thick section of a glass container wall). In any event, any coloration was within acceptable industrial limits for a standard flint glass. The coloration from the melt could be due to iron content or excessive color matching/masking, which can give rise to a hazy, cloudy, or muddy appearance.

Therefore, in the batch glass composition, it is believed that an oxide of sulfur level ranging between 0.25 wt % and 0.35 wt % in the presence of about 0.1 wt % of oxide of vanadium and about 0.1 wt % of oxide of selenium would provide good decolorization of the glass. More particularly, an oxide of sulfur level of about 0.3 wt % in the presence of about 0.1 wt % of oxide of vanadium and about 0.1 wt % of oxide of selenium is believed to provide particularly good decolorization of glass. However, it is believed that, depending on the amounts selected for oxides of vanadium and selenium, an acceptable range of oxide of sulfur may be between 0.05 wt % and 0.35 wt %.

The specific role of sulfur may be responsible for one or two different mechanisms. A first mechanism is the role of sulfur as a fining agent in a glass melt. Sulfur in this role produces sulfur gas in the melt that rises up through the melt and coalesces with other bubbles. This also mixes the glass melt and results in improved homogeneity. A second mechanism involves sulfur acting as a redox couple with the oxide vanadium and/or the oxide of selenium. If it is assumed that sulfur is acting to reduce the vanadium, such reduction would tend to shift the vanadium valance state to 2+. This valence state appears as a colorless/gray. In addition, it may be assumed that some of the sulfur is reacting with iron to produce a sulfur chromophore (a brown color in amber glass). In any event, there appears to be a direct relationship between increasing sulfur content and the production of a homogenous and/or decolorized glass. It is also possible that there is a maximum sulfur content where an amber colorization starts to dominate the color or that foaming of the melt surfaces starts to occur, but this was not examined during this work.

The method also includes melting the batched glass composition in a glass melt furnace to produce a molten batched glass. Accordingly, the ultraviolet light blocking enhancing material and the decolorizer additives preferably are melted with the base glass materials in the glass melt furnace. The conditions and procedure for composing and melting production container glass can be found in, e.g. "*Handbook of Glass Manufacture*," Tooley, Odgen Publishing Co., New York, N.Y., 1985, $3^{rd}$ edition. In a laboratory scale melt, the batched glass composition may be melted, preferably between 1400 and 1500 degrees Celsius for about two to four hours, more preferably between 1425 and 1475 degrees Celsius, and most preferably at about 1450 degrees Celsius for about three hours.

The method also may include forming the glass containers from the molten batched glass. The glass containers may be formed, for example, by press-and-blow or blow-and-blow processes and by individual section machines, or in any other suitable manner by any suitable equipment.

The method further may include annealing the glass containers in any suitable manner, for example, in an annealing lehr. At an entry, hot end, or upstream portion of the annealing lehr, the temperature therein may be between 600 and 550 degrees Celsius. Through the lehr, the temperature may be brought down gradually to a downstream portion, cool end, or exit of the lehr, for example, to a temperature therein of between 130 degrees Celsius and 65 degrees Celsius. In any event, the glass containers may be annealed, preferably between 550 and 600 degrees Celsius for about 30 to 90 minutes, more preferably between 525 and 575 degrees Celsius, and most preferably at about 550 degrees Celsius for about one hour. In any event, in one embodiment, the method may be carried out without having to heat the glass containers to striking temperatures. In other words, the glass containers need not be struck to provide decolorization.

The selenium potentially reduces the state of at least some of the vanadium from the trivalent state to a bivalent state in the glass. This reduction of the vanadium is believed to negate or mask the green coloration that otherwise would be produced by the vanadium. Such reduction may produce a generally colorless appearance, perhaps with a straw yellow to slight gray coloration in the glass and, in any event, a non-green appearance in the glass. It is believed that the slight gray color is attributed to a nearly uniform decrease of the percent transmission of visible light. The decrease in the visible light transmission may range from 10 to 20 percent less than a typical flint glass that is not decolorized. The decrease is based on the amount of vanadium and selenium additions to the base glass, wherein increases in the amounts of the oxides of vanadium and selenium additives results in decreases in the percent transmission in the visible light range. Accordingly, flint glass containers may be produced with good ultraviolet light blocking properties and without the green coloration normally associated with vanadium-doped glass. In other words, the oxides of vanadium and selenium additives and their disclosed amounts produce decolorized glass containers with non-green coloration, yet good UV protection.

The glass containers may have a retained glass composition that is different from the batched glass composition. For example, only about 10-35% of the oxide of selenium added to the batched glass composition may be present or retained in the retained glass composition. Similarly, only about 50-70% of the oxide of sulfur added to the batched glass composition may be present or retained in the retained glass composition. In contrast, the oxide of vanadium may be largely retained in the retained glass composition in the produced containers. In other words, the relative amounts of vanadium to selenium retained in the glass composition in the produced containers may be about a four to one ratio of vanadium to selenium.

The glass containers may include a total amount of oxides of vanadium and selenium present in the retained glass composition in an amount ranging between 0.016 wt % and 0.175 wt % total. In other words, the total combined amount of oxides of vanadium and selenium retained in the glass container equals 0.016 wt % to 0.175 wt %. Also, the glass container may include an oxide of sulfur content in an amount ranging between 0.03 wt % and 0.3 wt %. In another embodiment, the oxide of sulfur may be present in the retained glass composition in an amount between 0.08 wt % and 0.25 wt %, and the oxide of vanadium may be present in the retained glass composition in an amount ranging between 0.01 wt % and 0.14 wt %, whereas the oxide of selenium may be present in the retained glass composition in an amount ranging between 0.006 wt % and 0.035 wt %. In one specific example, the oxide of sulfur may be present in the retained glass composition in an amount of about 0.2 wt %, and the oxide of vanadium may be present in the retained glass composition in an amount of about 0.1 wt %, whereas the oxide of selenium may be present in the retained glass composition in an amount of about 0.025%. The soda-lime base glass materials may be retained in an amount ranging between 73.1 wt % and 99.9 wt %.

Several test samples were prepared in a laboratory environment and transmission of light therethrough was observed in each sample, as illustrated in FIG. 3. FIG. 3 illustrates six plots of light transmission vs. wavelength through six different samples of glass. The first plot, A, represents transmission through a sample of the base glass composition, standard white flint glass. The second plot, B, represents transmission through a sample of the base glass doped with about 0.1 wt % vanadium.

The best combination of results of decoloration, clarity, and UV light blocking was achieved in a base glass composition doped with about 0.1 wt % of vanadium and about 0.1 wt % of selenium, as represented by plot E. In addition to the decolorizing, the combination of the oxides of vanadium and selenium causes a shift of the UV light edge "A" further from the Ultraviolet towards the visible light range. For example, a light edge $A_1$ of plot A is at about 315 nm, whereas a light edge $E_1$ of plot E is at about 345 nm for a shift in wavelength of about 30 nm. Accordingly, the glass does not transmit UV light up to about 345 nm. As used with reference to UV wavelength, the term "about" means within 5 nm.

Other results were observed with other combinations of vanadium and selenium. For example, plot C represents a base glass composition doped with about 0.1 wt % of vanadium and about 0.0078 wt % of selenium. In another example, plot D represents a base glass composition doped with about 0.1 wt % of vanadium and about 0.05 wt % of selenium, wherein green decoloration was incomplete. In a further example, plot F represents a base glass composition doped with about 0.1 wt % of vanadium and about 0.2 wt % of selenium, wherein green decolorization was complete but the glass was dark flint in color with streaks of pink due to incomplete mixing of selenium which created non-homogenous sections in the glass.

Although the best results were achieved with 0.1 wt % of vanadium, glass doped with 0.05 wt % vanadium has shown better UV light protection. Therefore, it is believed that glass doped with 0.05 wt % vanadium and 0.05 wt % selenium may provide even better UV light protection, but may or may not provide better non-green and/or colorless appearance.

When vanadium is added, there can be observed a shift in light transmission towards the visible light range, a portion of which is blocked. However this induces a green coloration in the visible spectrum. With the addition of selenium there can be observed a further shift to longer wavelengths, providing an increased level of UV protection compared with vanadium alone. However as the level of selenium increases there can be observed a decrease in overall transmission, and a decrease in green coloration and an increase in greyness in the visible spectrum.

As shown by plots C, D, E, or F, the container has transparency characterized by 0% to 2% transmission at 340 nm to 350 nm wavelength, and by 60% to 75% transmission at 390 nm to 410 nm wavelength.

The best results were achieved by weighting out the raw materials for a 200 g-300 g batch, and in accordance standard batch calculation practice common in the glass industry. The raw materials were mortar-and-pestled to break up agglomerate material. The raw materials then were mixed together using a mixer for about ten minutes. While mixing, a crucible for the batched glass melt was pre-heated at 1350 degrees Celsius for about ten minutes. The raw materials were added to the crucible until the crucible was half-full. The crucible was placed in a furnace at 1294 degrees Celsius and reached a temperature of 1450 degrees Celsius after 23 minutes. After 29 minutes, the crucible was charged and the rest of the raw materials were added thereto. The crucible was placed back in the furnace at 1402 degrees Celsius and reached 1450 degrees Celsius after one minute. The raw materials were melted for three hours and then poured into two patties, and then placed in an annealing oven at 546 degrees Celsius. The glass is then annealed at 550 degrees Celsius for on hour before shutting off the annealing oven to let the glass cool down to room temperature overnight. The patties were annealed to remove stress.

One of the resulting samples was cut with a core drill to a 30 mm diameter, polished on both sides using a polisher and grit sizes of 240, 125, 75, 15, 9, 3, and 1 micrometer, and final polished with colloidal silica. The sample was spectrum analyzed with a PERKIN-ELMER LAMDA 900 brand analyzer.

As used herein, the term "clear" or "clarity" relates to the quality or state of being clear which quality can be measured through spectroscopy. These terms may be referred to as transparency throughout the visible spectrum, which is a function of wavelength. Sometimes the terms are also referred to as translucence. Also as used herein, the term "unstained" or "colorlessness" is an estimation that relates to the degree to which glass lacks color throughout the visible spectrum. Most transition metal ions have the capability of coloring glass, and the degree to which they are present determines the level of color.

There thus has been disclosed a glass container that is substantially clear and non-green or colorless, and related methods, that fully satisfy all of the objects and aims previously set forth. The disclosure has been presented in conjunction with several exemplary embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. In a flint glass container, an improvement for blocking UV light penetration into the container while providing decolorization in container glass,
wherein the container glass includes an oxide of vanadium and an oxide of selenium present in the container glass and wherein the oxide of vanadium is present in a retained amount ranging between 0.01 wt % and 0.14 wt % and the oxide of selenium is present in a retained amount ranging between 0.0125 wt % and 0.025 wt %.

2. The container set forth in claim 1 wherein the oxide of vanadium is present in an amount of about 0.1 wt %.

3. The container set forth in claim 2 wherein the oxide of selenium is present in an amount of about 0.025 wt %.

4. The container set forth in claim 1 wherein an oxide of sulfur is present in the container glass in an amount ranging between 0.03 wt % and 0.3 wt %.

5. The container set forth in claim 4 wherein the oxide of sulfur is present in the container glass in an amount ranging between ranging between 0.08 wt % and 0.25 wt %.

6. The container set forth in claim 5 wherein the oxide of sulfur is present in the container glass in an amount of about 0.2 wt %.

7. The container set forth in claim 1 wherein the oxide of vanadium is present in an amount of about 0.1 wt %, the oxide of selenium is present in an amount of about 0.025 wt %, and the oxide of sulfur is present in an amount of about 0.2 wt %.

8. A glass container having a glass composition including:
soda-lime base glass materials; and
additives including an oxide of vanadium and an oxide of selenium retained in the container glass and wherein the oxide of vanadium is retained in an amount of about 0.1 wt % and the oxide of selenium is retained in an amount of about 0.025%.

9. The container set forth in claim 8 wherein the soda-lime base glass materials are retained in an amount ranging between 73.1 wt % and 99.9 wt %.

10. The container set forth in claim 9 wherein the soda-lime base glass comprises the following materials in an amount by weight:
60-75% $SiO_2$;
7-15% $Na_2O$;
6-12% CaO;
0. 1-3.0% $Al_2O_3$;
0-2.0% MgO; and
0-2.0% $K_2O$.

11. The container set forth in claim 8 wherein an oxide of sulfur is present in the container glass in an amount ranging between 0.03 wt % and 0.3 wt %.

12. The container set forth in claim 8 wherein the oxide of sulfur is present in the container glass in an amount ranging between ranging between 0.08 wt % and 0.25 wt %.

13. The container set forth in claim 8 wherein the oxide of sulfur is present in the container glass in an amount of about 0.2 wt %.

14. The container set forth in claim 8 wherein the oxide of sulfur is present in an amount of about 0.2 wt %.

15. The container set forth in claim 8 wherein the composition is substantially free of As, oxides of arsenic, and hexavalent chromium.

16. A method of making glass containers including the steps of:
preparing a batched glass composition including soda-lime base glass materials, and including oxides of vanadium and selenium wherein the oxide of vanadium is present in an amount ranging between 0.03 wt % and about 0.1 wt % and the oxide of selenium is present in an amount greater than 0.03 wt % and less than about 0.1 wt %;
melting the batched glass composition in a glass melt furnace to produce a molten batched glass;
forming the glass containers from the molten batched glass; and
annealing the glass containers.

17. The method set forth in claim 16 wherein the combination of the oxides of vanadium and selenium produces a non-green appearance in the glass containers.

18. The method set forth in claim 16 wherein the combination of the oxides of vanadium and selenium improves ultraviolet light blocking of the containers.

19. The method set forth in claim 16 wherein the glass containers are annealed between 550 and 600 degrees Celsius for thirty to ninety minutes.

20. The method set forth in claim 16 wherein the batched glass composition is melted at about 1450 degrees Celsius for about three hours, and the glass containers are annealed at about 550 degrees Celsius for about one hour.

21. The method set forth in claim 16, without heating the glass containers to striking temperatures.

22. The method set forth in claim 16 wherein the soda-lime base glass materials are present in an amount ranging between 73.1 wt % and 99.9 wt %.

23. The method set forth in claim 16 wherein the soda-lime base glass comprises the following materials in an amount by weight:
60-75% $S^1O_2$;
7-15% $Na_2O$;
6-12% CaO;
0. 1-3.0% $Al_2O_3$;
0-2.0% MgO; and
0-2.0% $K_2O$.

24. The method set forth in claim 16 wherein the oxides of vanadium and selenium are each present in substantially equal amounts.

25. The method set forth in claim 24 wherein the amounts of the oxides of vanadium and selenium are each about 0.1 wt %.

26. The method set forth in claim 16 wherein the batched glass composition is substantially free of As, oxides of arsenic, and hexavalent chromium.

27. The method set forth in claim 16 wherein the batched glass composition also includes up to 0.4 wt % of an oxide of sulfur.

28. The method set forth in claim 16 wherein the batched glass composition also includes an oxide of sulfur in an amount ranging between 0.005 wt % and 0.35 wt %.

29. The method set forth in claim 16 wherein the batched glass composition also includes an oxide of sulfur in an amount ranging between 0.25 wt % and 0.35 wt %.

30. The method set forth in claim 16 wherein the oxide of vanadium is present in an amount of about 0.1 wt %, the oxide of selenium is present in an amount of about 0.1 wt %, and the oxide of sulfur is present in an amount of about 0.3 wt %.

31. A glass container produced by the method set forth in claim 16.

32. A method of making glass containers including the steps of:
preparing a batched glass composition including soda-lime base glass materials, and including oxides of vanadium and selenium in about equal amounts;
melting the batched glass composition in a glass melt furnace to produce a molten batched glass;
forming the glass containers from the molten batched glass; and
annealing the glass containers.

33. The method set forth in claim 32 wherein the oxide of vanadium and selenium are present in an amount ranging between 0.035 wt % and 0.25 wt % total.

34. The method set forth in claim 32 wherein the amounts of vanadium and selenium are each about 0.1 wt %.

35. The method set forth in claim 32 wherein the batched glass composition also includes up to 0.4 wt % of an oxide of sulfur.

36. The method set forth in claim 32 wherein the batched glass composition also includes an oxide of sulfur in an amount ranging between 0.005 wt % and 0.35 wt %.

37. A glass container produced by the method set forth in claim 32.

38. The method set forth in claim 32 wherein the oxide of vanadium is present in an amount ranging between 0.03 wt % and 0.1 wt % and the oxide of selenium is present in an amount greater than 0.03 wt % and less than about 0.1 wt %.

39. The method set forth in claim 38 wherein the oxide of selenium is present in an amount between about 0.05 wt % and about 0.1 wt %.

40. The method set forth in claim 16 wherein the oxide of selenium is present in an amount between about 0.05 wt % and about 0.1 wt %.

* * * * *